(12) United States Patent
Bourrieres et al.

(10) Patent No.: US 8,056,822 B2
(45) Date of Patent: Nov. 15, 2011

(54) METHOD FOR CERTIFYING AND SUBSEQUENTLY AUTHENTICATING ORIGINAL, PAPER OF DIGITAL DOCUMENTS FOR EVIDENCES

(75) Inventors: Francis Bourrieres, Montauban (FR); Clement Kaiser, Montauban (FR); Franck Bourrieres, Montauban (FR)

(73) Assignee: Novatec SA, Montauben (FR)

( * ) Notice: Subject to any disclaimer, the term of this patent is extended or adjusted under 35 U.S.C. 154(b) by 536 days.

(21) Appl. No.: 12/158,409

(22) PCT Filed: Nov. 9, 2006

(86) PCT No.: PCT/FR2006/002799
§ 371 (c)(1), (2), (4) Date: Jun. 20, 2008

(87) PCT Pub. No.: WO2007/077324
PCT Pub. Date: Jul. 12, 2007

(65) Prior Publication Data
US 2008/0267511 A1    Oct. 30, 2008

(30) Foreign Application Priority Data

Dec. 21, 2005 (FR) ...................... 05 12985

(51) Int. Cl.
*G06K 19/06* (2006.01)
(52) U.S. Cl. ......... 235/494; 235/454; 235/470; 235/487
(58) Field of Classification Search .................. 235/375, 235/435, 454, 462.41, 470, 487, 494, 488
See application file for complete search history.

(56) References Cited

U.S. PATENT DOCUMENTS

| | | | | |
|---|---|---|---|---|
| 4,389,063 A * | 6/1983 | Ryan | .......................... | 292/307 R |
| 4,908,717 A * | 3/1990 | Natori | ........................... | 358/474 |
| 5,657,389 A | 8/1997 | Houvener | | |
| 6,584,214 B1 * | 6/2003 | Pappu et al. | .................. | 382/108 |
| 7,251,347 B2 * | 7/2007 | Smith | ........................... | 382/108 |
| 2003/0000084 A1 | 1/2003 | Bourrieres et al. | | |
| 2003/0014647 A1 * | 1/2003 | Bourrieres et al. | ........... | 713/185 |
| 2003/0170387 A1 | 9/2003 | Bourrieres et al. | | |
| 2003/0219145 A1 * | 11/2003 | Smith | ........................... | 382/100 |
| 2004/0003295 A1 * | 1/2004 | Elderfield et al. | ............ | 713/202 |

(Continued)

FOREIGN PATENT DOCUMENTS

EP             0161181         11/1985

(Continued)

OTHER PUBLICATIONS

English Translation of International Preliminary Report on Patentability Chapter II for PCT/FR2006/002799 dated Oct. 20, 2008.

*Primary Examiner* — Daniel Hess
*Assistant Examiner* — Paultep Savusdiphol
(74) *Attorney, Agent, or Firm* — Vidas, Arrett & Steinkraus

(57) ABSTRACT

The present invention relates to a method for certifying and subsequently authenticating original physical or digital documents. The concept of the evidence lies in the dual nature of a physical information item and a digital information item, one being the reference for the other that cannot lie amended at the risk of the evidence being lost. For a physical original document (8) associated with a bubble seal (7) there is a corresponding time-and-date-stamped, proprietary paperless reference counterpart. For a time-and-date-stamped, proprietary digital original document (15) there is a corresponding reference counterpart in the form of a bubble seal (7).

14 Claims, 6 Drawing Sheets

U.S. PATENT DOCUMENTS

| | | | |
|---|---|---|---|
| 2004/0250070 A1* | 12/2004 | Wong | 713/170 |
| 2005/0038756 A1* | 2/2005 | Nagel | 705/76 |
| 2005/0075984 A1* | 4/2005 | Bourrieres et al. | 705/64 |
| 2006/0053303 A1 | 3/2006 | Bourrieres et al. | |
| 2008/0029945 A1 | 2/2008 | Kaiser et al. | |
| 2008/0142671 A1 | 6/2008 | Bourrieres et al. | |
| 2008/0217931 A1 | 9/2008 | Bourrieres et al. | |
| 2009/0014618 A1 | 1/2009 | Bourrieres et al. | |

FOREIGN PATENT DOCUMENTS

| | | |
|---|---|---|
| EP | 1252616 | 10/2002 |
| FR | 2013362 | 4/1970 |
| FR | 2765014 | 12/1998 |
| FR | 2852413 | 9/2004 |
| FR | 2860670 | 4/2005 |
| GB | 2304077 | 3/1997 |

* cited by examiner

METHOD FOR CERTIFYING AND SUBSEQUENTLY AUTHENTICATING ORIGINAL, PAPER OF DIGITAL DOCUMENTS FOR EVIDENCES

CROSS-REFERENCE TO RELATED APPLICATIONS

This application is a US National Stage entry of PCT/FR2006/002799, filed Nov. 9, 2006, the entire contents of which is hereby incorporated by reference, which claims priority from France Application No. 05/12985, filed Dec. 21, 2005.

FIELD OF THE INVENTION

With information dematerialization, administration services segmentation, and increased forgery, it has become difficult to provide evidence that a physical or digital document is an authentic original. This invention aims precisely at bringing a solution to this problem.

DESCRIPTION OF THE RELATED ART

Growth of international exchanges, globalization, are the main cause of forgery. This would represent more than 10% of the world commerce, growing ten times faster than international exchanges, and is at the origin of tens of thousands of deaths (fake drugs, adulterated alcohols, fake automotive, aeronautic parts, etc.). Correlative to this, forgery not only touches industrial products, it also includes official document forgery, and in that regard, it constitutes the first step of many traffics, crimes, and offenses. Such forgery, generalized at all levels, constitutes a source of concern and doubt at the consumer's level towards products as much as for an administration, a company, or a citizen towards a presumed original paper or dematerialized document.

So for instance, a person can falsify or even elaborate for his/her own needs a false individual identification record or a false birth certificate in order to receive a "real false" identification card. The civil servant who delivers the civil certificates, being another than the one delivering the identification cards, will consider the document provided as original because it presents all the characteristics to deem it such: the judgment is not formal, it is subjective.

In the same way, in order to prove the authenticity of lab research studies, there are dated labbooks, numbered sheet after sheet. Such documents, although useful cannot pretend to be unquestionable evidence before a court. In order to recognize an original document, numerous solutions have been invented and none of them provide conclusive results.

Today many designers, whether writers, photographer, painters, etc. create their works with digital tools. These original works no longer possess any physical reality even if afterwards they are translated on physical media to make copies, but how to prove that these copies are true to the original. For instance, digital photography is progressively replacing silver photography; for the creative photographer the true original is the negative, knowing that in turn photos translated on paper medium are prints, thus a photographer can prove that he owns the original work since he himself possesses it physically. With regard to a digital photo digital original, there is nothing today to prove ownership without doubt even though the image taking digital devices are now equipped with integrated customization and dating systems. With regard to digital originals, there thus poses a triple problem, that of document integrity in its initial content, that of the effective date of generation, and that of property.

There are numerous technologies to mark original documents. The technologies presented hereafter rest on impressions presenting two-dimensional random distributions (i.e. of particles) and preferably invisible to the naked eye. The major inconvenience of such techniques comes from the possibility to reproduce these random distributions because of bi-dimensionality. Indeed, on the one hand, it only takes an optoelectronic means to track the position of particles and, on the other hand, a sufficiently precise printing means to reproduce these random distributions. Besides the inventors of these different technologies are aware of it, since they recommend to hide the random distributions by using inks or magnetic particles invisible to the naked eye, or they recommend the use of secret codes to conceal information. In fact these technologies rest on a shared secret.

Patent FR2765014 concerns a paper document authentication method and its authenticity control device. Said document suggests to confer to the material constituting the paper document a random intrinsic characteristic during its manufacture and to associate it to the document for its later authentication. Such random intrinsic characteristic integrated to the material is indeed always unique, but it is not non-reproducible to an identical one, it concerns indeed marking the surface which it is quite possible to reproduce identically by realizing i.e. a silk-screen printing tool which openings and definition are a true copy of the random intrinsic characteristic. Then, it suffices to deposit magnetic particles (fibers or ink), or invisible ink in an identical way and therefore it is possible to reproduce an infinity of time the same document.

Patent FR2013362 relates to a document manufacturing and identification method as well as to the device for identifying said document. The object of said patent concerns a random deposit of finely divided particles invisible to the naked eye associated to an information, the assembly being recorded in a memory. To verify the authenticity, a comparison between what is read on the document and what is stored in the memory is made.

Document EP0161181 concerns a method and its remote document identification and authentication device. In such patent, an identification code (barcode type) as well as a random distribution is printed with ink invisible to the naked eye on the document that one wishes to make authenticatable by such method. An optoelectronic reading means records the identification code, the random distribution, as well as possibly an intrinsic characteristic pertaining to the paper medium constituting the document, in a memory after coding the information. To verify the authenticity of a document one compares the printed elements and eventually the intrinsic characteristic pertaining to the medium on which it has been archived.

Patent US 2005/038756 describes an authentication method of original documents whose medium constitutes an identifiable medium as in the previous patents.

To prove the authenticity of an original physical document, there is also the envelope type of trusted third party system called "SOLEAU", that consists in bringing the dated evidence of an idea, and comprises editing two rigorously identical documents and placing them in the compartment of a double envelope. Said envelope is then stamped and dated by the National Institute of Industrial Property which keeps one part and sends back the other to the bearer of rights. To bring evidence of an idea and of its date, the document contained in the bearer's envelope is matched with the evidence document contained in the envelope kept at the NIIP. There must be perfect agreement between both documents to prove authenticity of the information contained. The problem with such procedure is that a non-negligible delay (of at least twenty four hours) elapses between writing such document and officially receiving it with stamping and date/time stamping at the NIIP. Such a delay can sometimes become a real problem as it is not rare to have similar ideas occurring within a few hours on the same day. At this level of precision, the need of authentication and date/time stamping is of real importance.

Parallel to physical paper documents, there are solutions for authenticating computer data in text or binary file format. Such computer data need to be authenticated as original essentially in two distinct applications: either while archiving on a computer system, where, upon interpretation, evidence of content integrity and possibly date of generation of the data archived is necessary, or when communicating over a network, where, in this case, it is necessary to provide evidence that the data integrity was kept between the originator and the receiver, knowing that, when it concerns confidential data, the transmission system needs to be sufficiently secured so that no one can intercept the data. To answer these problematics, there are solutions called electronic signatures with symmetrical or asymmetrical, public and private, key means. Another solution is archiving on WORM (Write Once Read Many) optical medium for recording data without possibility of modification. Nonetheless, in this method it is always possible to recopy the whole medium onto another medium while adding or suppressing data. Today, such type of medium (CD-R, DVD-R) is incorrectly recognized as legal by some States.

There are also archiving solutions of secured and tamper-resistant computer data aimed at certifying the authenticity of data recorded at a given date. Such systems are implemented on write once archiving devices which, in theory, cannot ever be modified. Cryptographic methods permit to complexify the archived information access in order to make possible forgery very difficult. Such systems are meant to provide a legal value to private computer records. Such electronic devices try to remedy the ease of reproduction and forgery of original paper document records, which is entirely under the control of the people who store and monitor the information, and who therefore may falsify it by additions, deletions, and/or a posteriori antedating. With information dematerialization, this solution is certainly the most lively in terms of timing but it is only logical evidence which can still be questioned over time because the guaranty of system inaccessibility is not timeless. There are also trusted third party archivers, the major problem with this solution concerns the archiving of confidential and/or concurrent information which can always be read and communicated by employees working in these facilities.

Patent application FR2852413 describes an electronic self-archiving device. This type of device seems to be very well adapted for use in the method described with this invention where it can operate as a recording means for evidence, as will be seen hereafter. With this kind of method, the evidence is located within the device itself, which is both judge and party, and where anyone in a court can question the authenticity of such or such logical information contained and used as evidence because the evolution of electronic technologies is such that what was inaccessible and non-forgeable at one time may become accessible and forgeable at another time. With such method, the actual physical original telltale constituting evidence of archived information is missing. However such original telltale can only constitute evidence if it is itself deemed non-forgeable.

It becomes obvious that the solutions contributed for constituting integrity evidences (content, date, property, author) for data in digital or computer file format are solutions which are themselves in digital format.

Constituting evidence for original written documents, the writing itself exists whose handwritten signature attests of its content and of its author, subject to authentication of both. However, if a dematerialization is desired, the current solution is digital and, therefore the physical original becomes digital original, but we loose track of the physical paper original if it is destroyed.

Starting from an assumption accepted throughout the legal system, that only physical evidences exist, and that a document is conclusive when its integrity can be traced from its generation until its interpretation, this causes a real problem today because information transits more and more as computer data and not as paper documents in the physical sense, which disappearance is precisely what one wishes, at least in part.

None of the solutions proposed to this day resolve both the double problematic of constituting evidences of physical originals and/or of logical originals; there are very different solutions for one and for the other as seen previously. Moreover, with regard to logical originals, the real problem of integrity conservation time of all elements (content, time stamp, author) is before us because of the constant evolution of computer computing power enabling sooner or later to access shared secrets in exclusively encrypted digital solutions, thus opening the door to forgery and information forgery with the consequences of reassessing authenticity evidences. Such uncertain security over time is particularly damaging for all information where a very long time may go by between the generation and evidence restitution.

SUMMARY OF THE INVENTION

This invention precisely aims at bringing one or more sure evidences that will have legal and lawful values to authenticate documents as originals or true copies of originals, or information as being originals, as much in the integrity of their content, of their production date, and incidentally of their author or owner. The method according to the invention concerns both original certification procedure and future authentication procedure of elements qualified as originals. The first characteristic of this invention is that it is as well applicable, contrary to everything existing today, to the authentication of physical forms (paper) of documents, as to digital data. This invention relies on the necessity to constitute evidence of a physical original document, and evidence of a date/time stamped logical evidence document, and reciprocally, to bring evidence of date/time stamped physical original telltale for a strictly logical information. It is the relation and the identity between these two documents that enable to affirm that the document is authentic or date/time stamped information is authentic. The evidence of authenticity rests on the physical/logical and logical/physical duality. It is a mixed authentication method. The word information here is considered broadly speaking (text or binary file) as the word entered or captured by an operator on a computer, i.e. an email. Original document is assimilated to a physical medium, original information is assimilated to computer data, both having the same meaning within this invention, only the medium differs.

According to the invention, the method applies in a particular way an association of known means, namely means enabling, on the one hand, to mark physical or logical documents and to record them, and, on the other hand, capturing or reading, archiving, and encoding means that require or not particular adaptations, the whole acting in a combined fashion by producing a synergy leading us to the sought-after result, i.e. to propose a very high security method including the certification of original paper or digital documents, and the authentication of aforesaid originals at the time of their interpretation.

According to one essential characteristic, the evidence of authenticity of an original physical document or of an original digital information is contributed by a telltale that is built during the certification phase of the physical or logical originals. After certification, both parts "original/telltale" as a whole form an inseparable block for which any trespass or trespass attempt for modification should be balanced in each part in order to not being seen, yet such attempt irreparably entails loss of authenticity. Consequently, the method according to the invention shall offer, to the parties and/or judge called to pronounce the authenticity of physical or digital originals, a binary method, not subjected to interpretation, whose level of security will no longer depend upon the performances of information computing powers or upon the discovery of any secret shared in an encrypted algorithm.

According to a set of characteristics, the principle of operation is as follows: two independent databases are used. The first one, BD1, is a trusted third party within which are pre-recorded the authenticating parts of physical seals, which will be associated with the documents or with the information to be authenticated, with possible assignment to a person and/or an institution. The other database, BD2, is an "Electronic Safe" or (–R) or (+R) type of CD or DVD recording system, non-rewritable, where all information can only be added and date/time stamped, but cannot be modified, BD2 archives documents or information certified by its originator, as well as the associated corresponding seals. As will be seen hereafter, the non-rewritable CD or DVD media are made unique through a very high security seal built in the medium in order to be able to seal the original data recorded to this medium and not another one. A scanner type reading device enables simultaneous acquisition of the physical document to be certified and of its associated seal. In the case of computer data, the reading scanner is only used to acquire the seal, knowing that the association with the data is provided through the memory of the computer in which they are archived. The acquisition device is connected, on the one hand, with BD1 in order to query it on the validity and the assignment of the seal it used on the document or on the information to be certified and, on the other hand, with BD2 in order to transfer the documents or information, and associated seals read and certified for recording and date/time stamping purposes. For reasons of unique assignment of a document to a seal, trusted third party BD1 can reject any seal being already assigned, considering it is in use. With regard to constituting evidence that a document is presumed authentic, one proceeds in the following way:—the presumed authentic document is read by the reading device connected to BD1 and BD2, then in a first step, the device authenticates the physical seal associated to the document by querying BD1, then it queries BD2 asking it what logical document that seal is associated to. Finally a matching is performed between the presumed authentic document and its digital telltale. If there is identity of information, it is evidence that the document is authentic.

According to another characteristic, the authentication method of original documents operates by comparing the presumed original physical document or a computer original information product with its total or condensed digital representation archived in a database or a non-modifiable, non-rewritable, and non-duplicable recording system. Said comparison can be visual or automatic.

According to another characteristic, the process consists in the following steps:

a) the original document or the original information, which content integrity is certified by the originator, is associated to a unique and non-reproducible mark constituting a certification and authentication seal previously integrated or reported under the form of a seal: recorded in a database and delivered by an authorized authority or trusted third party indicating the affiliation to the originator or to the beneficiary of the document original or of the original information to be certified, said mark being affixed directly on the document by the originator of said original document when it is a physical reality such as paper or photo, or on a sheet of blank medium when certifying computer data. This mark constituting an authenticator may possibly be a intrinsic chaotic characteristic of the medium itself (i.e. paper fibers) with however a preference for markings impossible to reproduce, as will be seen hereafter, in order to avoid any future controversy and to offer a high and timeless security level.

b) said original physical document, or similarly the blank medium sheet associated to the unique and non-reproducible mark, is digitalized opto-electronically by a device permitting, in a single operation, to link the content of the original physical document or the original computer data with said unique and non-reproducible mark. The reading device is connected directly or indirectly, through a wired communication network, or radio, or the internet, to a secured, local or remote, computer recording system BD2, where all added information is date/time stamped, non-modifiable, and non-rewritable.

c) The original document or the original information, and the associated unique and non-reproducible mark is sent, archived, and date/time stamped into the BD2 recording system.

d) To subsequently prove the authenticity of the original physical document or of the original information, a match and a comparison are performed between aforesaid original document or original information, and their logical copy archived in the BD2 recording system at the associated marking or seal address, or by comparing the condensed summaries product of the applied hashing function integrating content, date and owner.

In case of an original information written from a computer keyboard, the issuer certifies his information by drawing a link to the unique and non-reproducible seal at the time of sending to the BD2 archiving and recording system. Then it publishes a paper document by gluing the authentication seal or mark used for sending. Therefore, even if he wants to modify the document thereafter, he cannot because there would not be no more match with what is archived in BD2 since this base is non-modifiable. Similarly, he cannot transfer the mark or seal used on the original on another document because it is destroyed in case it is taken out, and it cannot use another seal that would be identical because each seal is unique and impossible to reproduce with regard to its characteristic authenticating parts.

European patent No EP1252616 by the same applicant and same inventors, corresponding to WO/2001/057831 and U.S. Pat. No. 7,380,128, describes a bubble authentication, constituting a means of marking documents, very well adapted to the purposes sought-after by this invention. Such type of authenticator containing auto-generated bubbles is not only always unique but still impossible to reproduce by natural or artificial means. Man, as a potential forger, is thus ruled out of any possibility of ascendancy or influence, or of direct and indirect action on the object of evidence and on its measure. This authenticating with voluminal bubbles, therefore with three dimensions, indeed has remarkable optical properties, which make the bubbles perfectly visible although they are as transparent as the polymer in which they are contained. Different diffraction indices provide this discriminative particularity. Statistical computations have shown that the reproduction probability is $1/10^{160}$ upon creation, with a number of bubbles varying from 20 to 40 per authenticator. From another point of view, this type of authenticator is very well adapted to this type of document authentication application because if it is practically always unique at the time of creation, it is actually also non-duplicable artificially, because the chaotically self-generated bubbles are impossible to be reproduced with a polymer/bubble border sharpness, which definition level is at the molecular level. It is subsequently an optical interpretation that can certify whether it is a natural bubble code or a cloning attempt that would be inevitably detected. Such properties are extremely important from two points of view. First, it is realistic to affirm that such type of bubble authenticator would never be counterfeited because even if new technological means come up notably in nano-technologies, on the one hand, they would never permit to equal naturally produced surface states, and, on the other hand, it seems impossible to close volumes without material on themselves, and above all, it would take to cloning not just one but a plurality of bubbles, moreover of various forms and positions, knowing that with regards to biometric interpretations today, the reading technology development is what is going to make the bubble code optical interpretation even safer. Second, the safety solution that permits to certify and subsequently authenticate by bringing unquestionable evidences, is no longer built on exclusively digital foundations which, as everyone knows, are not lasting and open the way to forgery for at least two reasons: on the one hand, they are created by man who can always reveal his secrets, and, on the other hand, with the computing powers evolving with computers, no encrypting algorithm can guarantee a conservation time of secrets, which brings a real problem when pretending to certify and authenticate documents or information for which there is no time limit. In this case using an bubble authenticator, the safety solution no longer rests on a man-made virtual digital reality but on a physical reality not controlled by man, which is measurable, always unique and impossible to falsify even over time, accessible in read-only, and not write, which will enable to enter the digital world by building unquestionable and lasting security solutions.

Patent application PCT/FR2005/002706 by the same inventors, corresponding to WO/2006/048542 and US Pat. Pub. 2008/0142671, mentions the use of a bubble authenticator to form a seal. In that invention, such type of seal is perfectly appropriate in its principle as marking system for paper, reading scanner, and CD-R or DVD-R type of digital archiving media used for the BD2 data base, nevertheless it requires to be physically adapted for use on these types of medium, so that it is not separable from them without losing their integrity. According to one characteristic, the bubble authenticator is chemically glued to a medium itself adhering but partially destructible upon pull-out. Such physical integration form enables to glue the bubble seal directly onto the paper medium or on the plastic medium of a CD or DVD, so that any recuperation or pull-out attempt to substitute said bubble seal to another original document or DVD becomes impossible because its integrity is lost which constitutes an alarm. In order to be visually interpretable, the adhesive medium of the bubble seal is reflective i.e. of a silvery color. Similarly, it can be advantageously used with a special paper in perfect harmony with the above-described seal, in order to accentuate and reveal unquestionably the destructive properties upon attempt to pull-out or extract the seal from the document or DVD. For easy operation or security improvement, said seal can be associated to an identity with an alpha-numeric code, barcode, or 2D or RFID label, or even a unique signature extracted from the authenticator characterizing part. Such signature or identity constitutes the address in the BD2 archiving system.

The authenticating part and the seal identity are pre-recorded in a centralized BD1 database constituting a trusted third party. Said bubble seal is listed in said BD1 database and indicates its affiliation of the original document to be authenticated to its owner or its beneficiary. As an example, a laboratory, an institution, an administration, a notary, a lawyer, or a company will order and have its own seals. Thus, such seals are not anonymous but already assigned to an institution independently of their future uses by aforesaid institution. It is noteworthy that bubble seals are a preferred mode, although another form could be used knowing that, as will be seen hereafter, the security level lays in the performance of inability to be copied of the authenticator used.

According to another characteristic and in order to have evidence of document traceability, in addition to aforesaid document authentication, the reading device is identifiable and authenticatable as a unit in order to prove its affiliation and its issuing origin when comparing for evidence. Such characteristic can be very useful to track the document, it can be foreseeable to equip such device with a GPS type of geolocalisation system for a total autonomy in case of nomadic devices and GPRS type or Internet communication systems. This can be a bubble seal system of the same nature as the one posted on the document to be authenticated but could be of another kind. The bubble seal of the reading device integrated in the device is read and is recorded simultaneously upon reading the original document and its seal. Both seals are therefore associated in the BD2 recording system. Similarly the bubble seal particular to the reading device is pre-recorded and assigned to an owner or tenant in the trusted third party BD1 database; it becomes thus easy to prove the origin of the device used for digitalizing the original document for the purpose of recording in the BD2 archiving system.

Depending on the cases, the acquisition device is a scanner enabling to simultaneously read a paper document with its seal; such mode of use is suitable when the document is prepared separately. According to another case, the acquisition device will only be a seal reader, such mode being suited when the document is a computer-generated electronic file; in such case, the association between the seal and the electronic file takes place simultaneously upon sending to the BD2 recording base.

According to this invention, the general application process is as follows: It includes two main steps: The first step is an acquisition and recording procedure of the original document for certification, and the second step is an authentication procedure of aforesaid document when it is brought as evidence of the original quality.

1) The acquisition and recording procedure for the original document certification is the following:
  User, owner, or tenant assignment and pre-recording of bubble seal linked to the reading device and its authenticating characteristics in the BD1 database constituting a trusted third party.
  Pre-recording and user or owner institution assignment of adhesive bubble seals enabling to authenticate each original document or original information in the BD1 database constituting a trusted third party.

Apposition by collage of a bubble seal on the original document to be authenticated, or on a annexed medium in case digital information.

Placing the original document or annexed medium equipped with its seal on the scanner, and launching global reading of the document and of the associated authenticating part contained in the seal, and, simultaneously within the same reading, of the bubble seal linked to the scanner.

Querying trusted BD1 database in order to verify whether the bubble seal affixed on the paper medium is prerecorded, not used, and possibly not yet consulted, then transmission to BD2 recording organ for final document logical recording with time stamp, and/or recording as a condensed summary produced from applying a hashing function. The BD1 base doesn't record the document content but records the bubble seal use, and possibly but not necessarily its date and time of use.

Recording bubble seal (7) use in BD1 base (9), with date and time of use, and possibly scanner used.

2) The authenticity checking procedure of the presumed original document is as follows:

Reading from the bubble seal associated to the presumed original document or original information through automatic reader, connected to the private BD2 recording system.

Querying and sending by BD2 of the content associated to the bubble seal appearing on the presumed original document.

Comparing the original presumed document and the content transferred. If they match, the document or information is authenticated.

According to another characteristic, it becomes possible to track the authenticated original document from knowing the device that did the reading or acquisition during its recording in the BD2 system. In order to achieve that, the bubble seal 2D image retrieved by BD2 during the verification step is simply read using the reader, and the trusted third party BD1 database is queried to know the reading scanner assignment.

For its application, this invention requires a device to capture or read the original document, and the associated unique and irreproducible seal such as a bubble seal as already explained. The reading operation is the phase prior to recording in the suitable secured and tamperproof system called BD2, as previously defined.

According to a characteristic of this device, it enables to associate in a single capture phase the authenticating seal, which characterizing parts are unique and irreproducible, with the document content constituting the original information. As the case may be, in this acquisition phase the device permits to prove that the authenticator is valid, for a bubble seal it enables to prove that the bubble authenticating part is tri-dimensional and that this seal is indeed recorded in BD1. This capture operation is preferably optical but it could be of any other nature, i.e. magnetic, X-rays or any other combination.

According to a preferred mode of the invention, the capturing optical device is a scanner.

In order to not only authenticate but also to track the reading device, the latter is has a built-in unique and irreproducible authenticator which characterizing parts appear at each document capture by association with the authenticator linked to the original document to be captured. This unique and irreproducible characterizing part is preferably built-in the device by its manufacturer, and recorded then activated in BD1 respectively during the sale and implementation phases of such equipment.

As previously seen with the description of the general implementation process, the preferred solution with regard to the choice of the acquisition device authenticating element tends to be a bubble authenticator itself implemented as a seal that makes it inseparable from the device without risking to destroy it. Such choice of a bubble seal is applicable to the original document as well as to the reading device within which it is built in. This bubble seal is placed so that it can be inevitably and systematically captured with each launching of the acquisition procedure for certifying the original document. Consequently, there is an association between both bubble seals e.g. that of the reading device and of the original document. In order to prove that those are true bubble seals and not decoys, the digitalization device according to the invention is equipped with a driven punctual light bar capable to generate several successive lightings during the displacement of said bar in order to cause reflections on the bubbles of the seals. Said reflections are captured as the light bar progress over the bubbles. Thereafter, an analysis of the reflections generated enables to prove the bubbles are real and no decoy or photocopy. Without leaving the context of this invention, all other means of scanning can be used for authenticating the veracity of the seal's authentic part, and, in this particular case, the volumic aspect of the bubbles. As an example, tests were conducted to scan twice without changing the conventional lighting of the scanner, under such conditions, the optical behavior response of the bubbles for one pass then for another was different, which enables to prove the tri-dimensional aspect. Similarly, this type of conventional scanner can be equipped with a second CCD or CMOS optical sensor adapted for bubble seal imaging and intervening for this function only. In some cases of use, a conventional scanner may be sufficient, knowing that the author or the owner of the documents or information wants to certify his own original, he is not about to try to use a fake bubble seal (i.e. a photocopy of a real one) of which the scanner would not prove the tri-dimensional aspect, knowing that at the time of a control for evidences, the fraud would be detected and the original's owner would lose all his rights, which would be equal to cheating on oneself.

According to another characteristic, the acquisition device according to the invention permits, through another operation, to reread the original document and do an automatic comparison with the matching document archived in the BD2 archiving organ, and decide in all due objectivity whether both documents can be deemed identical. If the documents are not identical, the system can also automatically provide what the differences are between the presumed original document and its representation archived in BD2. At the time of the comparison operation for evidence, an acquisition system and the original document would need to be available. From this state, it is possible to edit and/or send true copies of the original. Knowing the access signature in BD2 from the seal enables to edit the logical and certified document associated to said signature. According to a particularly secured characteristic of use, the logical content of the document or information archived in the BD2 system is associated to the unique logical signature extracted from the physical authenticator, in order to generate a one way hash code notably of all this information, notably by combination with the time stamp. Under these conditions, the original document with its associated seal needs to be in hand in order to prove the authenticity of the original document and therefore of the integrity of its content. Applying a hashing function to this set of digital information enables to generate a condensed summary printed on a sheet of paper, and then materialized and certified by the physical presence of the glued bubble seal. Practically, the summaries or digests from the applied hashing function are recorded both on the original and on the telltale at the time of certification. When an authentication is requested, said summaries are compared for assigning or not, according to their similarity, the sure qualification as authentic original. To that moment, the whole date/time stamped original content can be sampled from the BD2 archiving system.

According to another version of the acquisition device, it is possible to process the original information directly on the device using a keyboard and a computer associated or completely built-in aforesaid acquisition device. In order for the issuer to authenticate this information as being original, it is then proceeded as previously by associating the unique and irreproducible seal (bubble seal type) prerecorded in BD1, although only capturing the seal, knowing that the association is automatically realized at the initiative of the issuer by sending the assembly to the BD2 recording system. In this version of the device, and in order to constitute the original physical assembly, it is then possible to produce a paper version of the document, and to glue on it the authentication seal that was used for its transfer and its archiving into BD2. Another preferred way to materialize computer data without having to print all sheets consists in applying a hashing function including the content, date, signature of the bubble seal related to the original, author identity with biometric print, file size, bubble seal signature in relation to BD2, namely that associated to DVD (13), in order to generate a unique condensed summary to be printed on an annexed sheet of paper, acting also simultaneously as physical medium for the authentication bubble seal. So some extremely voluminous computer data can be materialized for strong authentication purposes on a simple sheet of paper. This method presents not only a very high but also lasting security level because the signature extracted from each bubble seal is built from a non-modifiable physical reality in read-only and never write access, which makes it a constant in the applied hashing function and therefore suppresses any forgery risks of the data taken into account because it always requires to find the same condensed summary. So the bubble seal, from its intrinsic uniqueness and impossible duplication physical properties constitutes the keystone of information safety. Subsequently, the checking procedure remains unchanged.

As previously mentioned, the BD2 database can be an electronic safe type of device or a digital recording type of medium such as CD or DVD type of write only once, non-erasable, and non-modifiable optical disk, or a USB type key with non-erasable memory. Generally the electronic safe type of devices haved a built-in clock in order to time stamp each record. With regard to recording by burning an optic disk, the date/time stamping of each record is done from a computer link using Internet through one or several NTP (network time protocol) type of universal time servers.

Authenticating the integrity of a document or information with date/time stamping of its constitution is no evidence of its author's origin. Thus, according to another claim, the BD2 database is a write-once CD or DVD medium equipped i.e. with a glued bubble seal in the central ring, or directly integrated by over-moulding in the plastic material around its spinning center. Such adapted form of bubble seal has a function similar to those used for documents. Such bubble seal definitely associated to a DVD medium is prerecorded and assigned to its owner in BD1. Similarly, the identity of the bubble seal and its assigned owner or institution, are initially engraved in the DVD before any recording; there is thus a match between the information archived in BD1 and that engraved on the optic medium. Even if it is still possible to copy the information contained on the CD or DVD on another medium whatever its nature, the original DVD remains unique from the only presence of the bubble seal, and therefore constitutes the only valid telltale or evidence. According to another characteristic, in order to increase the security level, but especially to prove the property of the information recorded, and to avoid a DVD substitution in order to use it without its owner's knowledge, the DVD is personalized for example by engraving at least its owner's biometrical print such as a fingerprint. This engraved print conditions the opening of a recording session by the adequacy control between the recorded print and that captured through a sensor connected to the computer, said biometrical print can advantageously be combined with other elements in the applied hashing function, and link ownership with recorded originals. Naturally such access control to certify and prove the ownership successively by recording and reading digital prints can also be applied to any archiving system that functions as BD2.

DETAILED DESCRIPTION OF THE INVENTION

Figure 1:
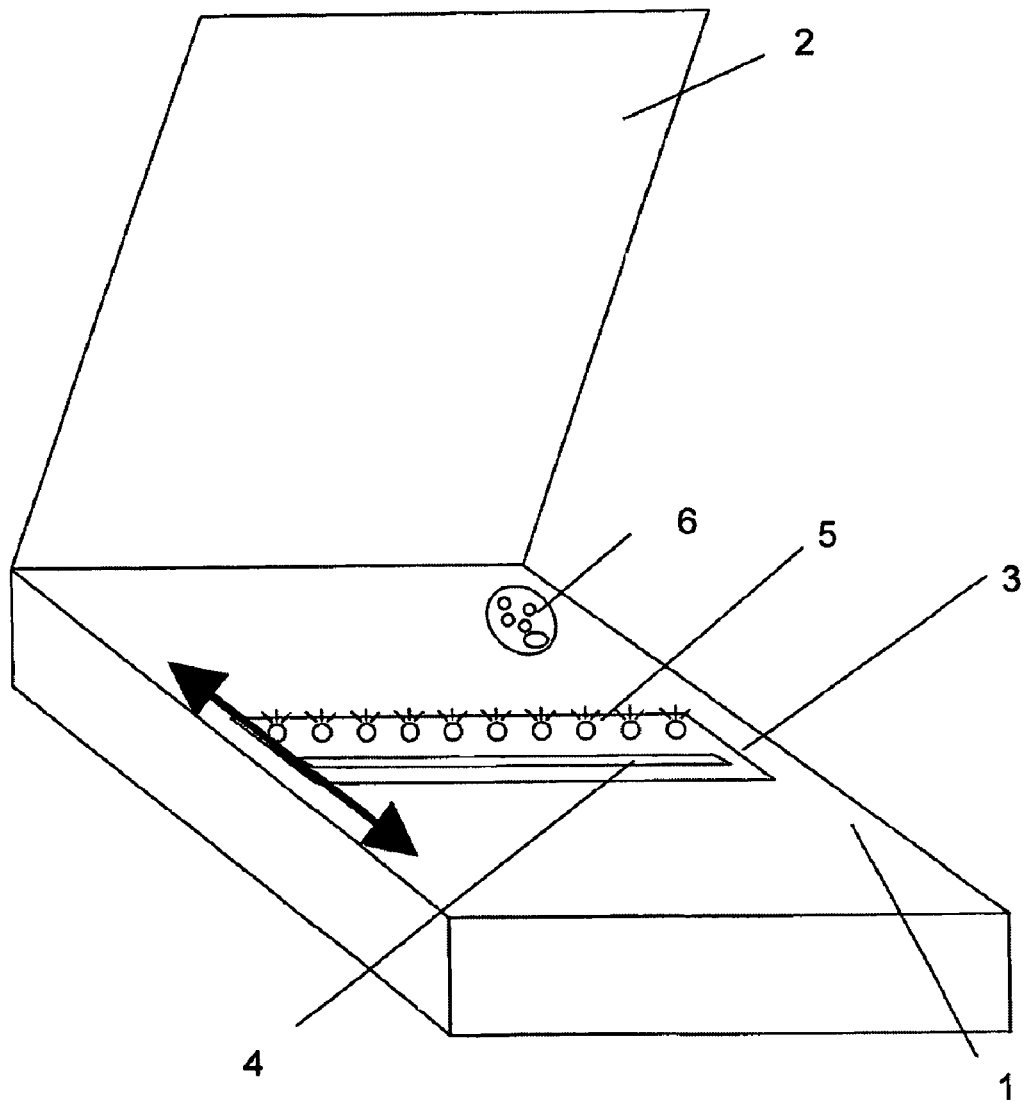
FIG. 1 shows a perspective view of a scanner adapted for acquiring original documents prior to their recording and to their later authentication for evidence according to the present invention.

In FIG. 1, is represented a scanner especially adapted for acquiring original documents prior to their recording and to their later authentication for evidence.

Top (1) of scanner is a transparent glass that receives the document to be authenticated. Mobile part (3) of the scanner includes as for all scanners a CCD type of optic sensor with mirror technique and uniform lighting rail (4). An electroluminescent diode rail (5) is associated parallel to said lighting rail with a frequency and order of lighting function of the scrolling speed and of other factors not described, so as to act on the formation of reflections at the border separating the bubbles of the transparent material notably to prove the bubble volumic aspect e.g., their tri-dimensionality. The scanner is equipped with a bubble authenticator (6) built-in the transparent glass. Said authenticator, always unique and non-reproducible, is read each time and simultaneously upon reading the original document to be authenticated. A lid (2) covers the assembly for realizing the acquisition, any opening while acquiring stops and cancels it in order to avoid any fraudulent maneuver. The corresponding security device can be of any kind and is not represented here. The scanner can integrate an electronic module for a secured connection via a telecommunication network such as Internet to each of BD1 and BD2 databases. Said scanner can be independent, i.e. connected to a computer for sedentary use, or said scanner can be integrated to an autonomous assembly including the processing computer, the means linking to independent BD1 and BD2 bases, possibly means for producing certified photocopies, an automatic means for feeding paper and authentication seals. This type of device is also usable in two ways: A first way during acquisition of the document(s) for logical recording for evidence, a second way as means to access BD2 recording system through the seal or its unique signature to be able to produce a true paper copy of the original, i.e. through a printer, itself built in the device. This device version is particularly interesting for travelling applications. It is noteworthy that for the sole certification operation, i.e. acquisition and archiving in BD2, a simple office scanner is sufficient because the necessity to verify the tri-dimensionality of the bubble authenticator is not imperative and intervenes only when it is later necessary to prove the intergrity of the content, date, and possibly ownership. Upon certification, the reading scanner should therefore at the very least, only verify the identity of the bubble seal and its authorization of use provided by BD1, knowing that, if the issuer stuck for example on the document, a photocopy of the bubble seal, thinking to be able to keep the original seal for later use, this operation would go against his interests because, on the one hand, when authenticating, the evidence would be made that the document is not original and, on the other hand, at the time of an later attempt of using the true seal, it would not be implemented because it would already be used in BD1.

Figure 2:
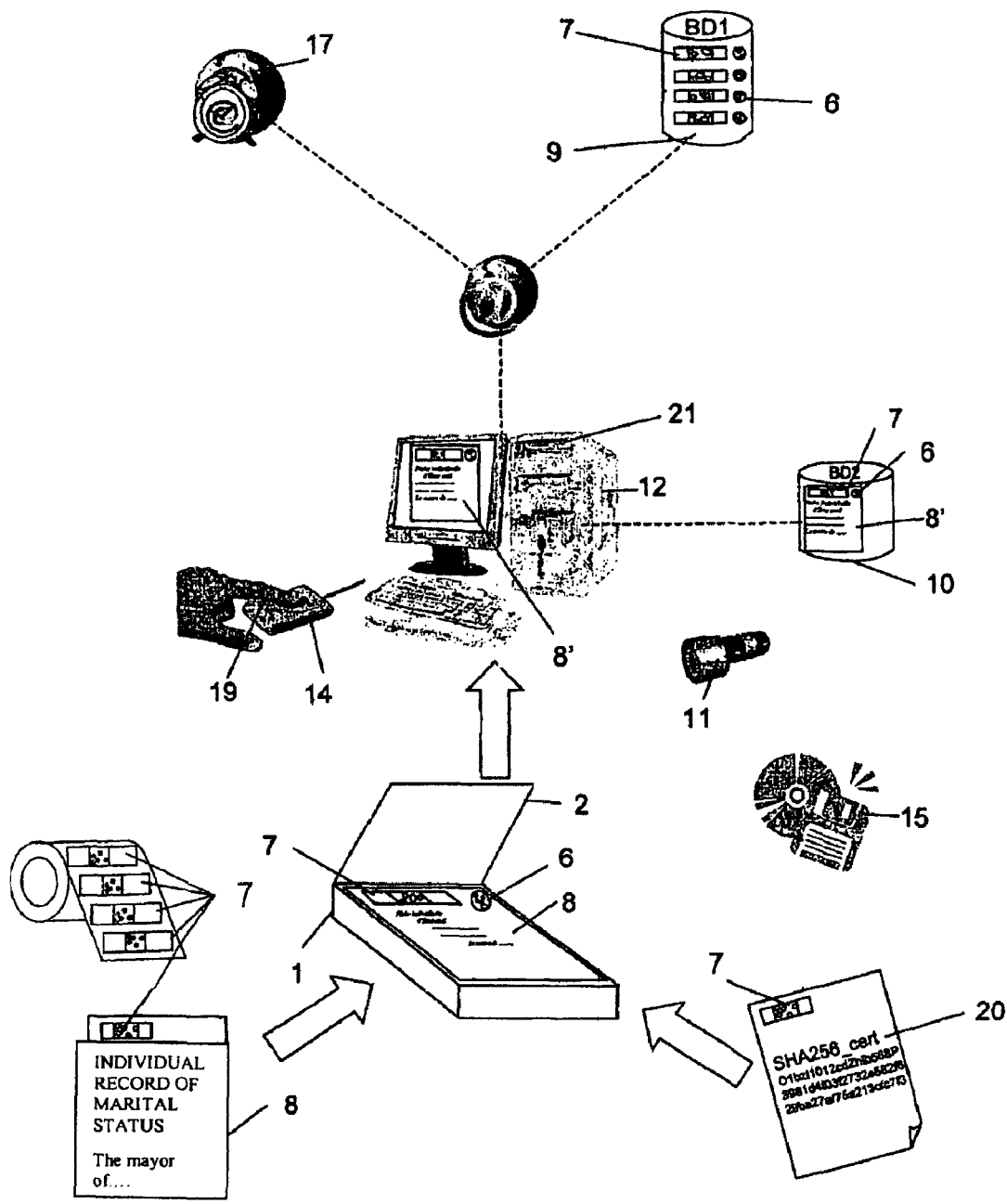
FIG. 2 shows a schematic view of the general processing operation of the present invention.

In FIG. 2, a synoptic of the general processing operation is represented.

Bubble seals (7) relative to documents (8) or information (15), bubble seals (6) relative to scanners (1), bubble seals (16) relative to optic disks (13) are recorded and assigned to their respective owners in a trusted third party BD1 database (9) accessible through telecommunication network. In (7) are represented rolls of bubble seals adapted for authenticating originals (8) (15). A bubble seal (7) is glued on a document (8) to be certified constituting the original or on a paper medium (20) for printing a digest of a digital file to be certified. Said document (8) (20) is then placed on the glass of a scanner (1). Bubble seal (7) belonging to document (8) or (20) and bubble seal (6) belonging to scanner are placed so that they are seen by the scanner capturing element when scrolling. Lid (2) is lowered and the capture process can start. Typically, a first traditional capture is done, for positioning the whole document and to geographically position the bubble seals. Then a second capture is taken without opening lid (2) in order to analyze and interpret the bubble seal authenticity using the combined action of electroluminescent diode (5) lightings. This capture operation triggers the query of trusted third party database BD1 (9) where the references and assignments of seals (7), (6) relative to original (8) (15), and to scanner (1) are archived. At this level, a matching of recorded and assigned bubble seals is realized, the scanner can then conduct the transfer operation of all elements captured i.e. the content of the document and bubble seals to BD2 recording system (10) (13). Communication between acquiring device and BD1 and BD2 takes place through of a private or public, local or remote, telecommunication network. Hence, in a single operation, a certification action of a document or information as being original is established, as well as the constitution of a digital evidence, which is telltale of said original, with knowledge of the device on which said operation occurred. As for the procedure for demonstrating that a presented document passes from the status of presumed original to the status of authenticated or certified original, the steps are as follows: presumed original document (8) (20) is presented, an automatic bubble seal reader (11) or a device identical to the one that made acquisition (1), is provided to make a formal acquisition of bubble seal (7) embodied in presumed original (8) (20). BD2 recording base (10) (13) is queried about the actual existence of said bubble seal (7) and about the content of associated document or information. Then appears on computer screen (12) or on a non-represented printer, a document (8') to which presumed original document (8) (15) will be compared. If there is identity between (8) (15) and (8'), document (8) or information (15) may then qualified as authentic originals. In order to know the issuing origin of original (8) (15), a simple reading of bubble seal image (6) appearing in (8') and a query of BD1 reference database (9) enables to identify the issuing scanner, its owner, and possibly its issuing location.

Figure 3A:
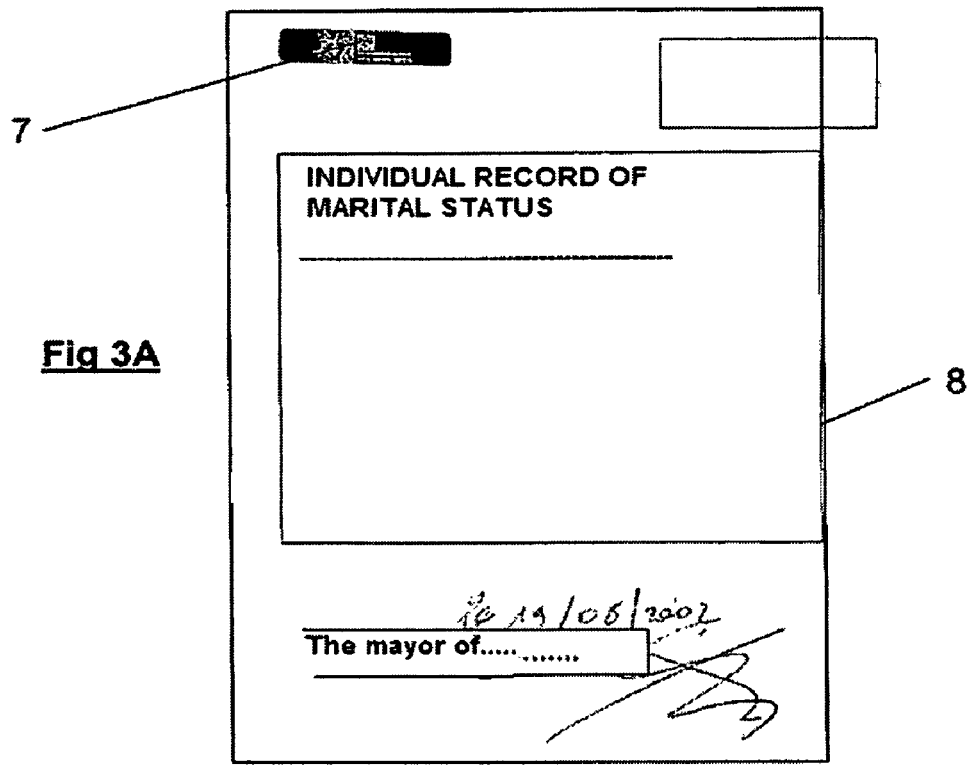
FIG. 3A shows an exemplary embodiment of an original document with a seal of the present invention.
Figure 3B:
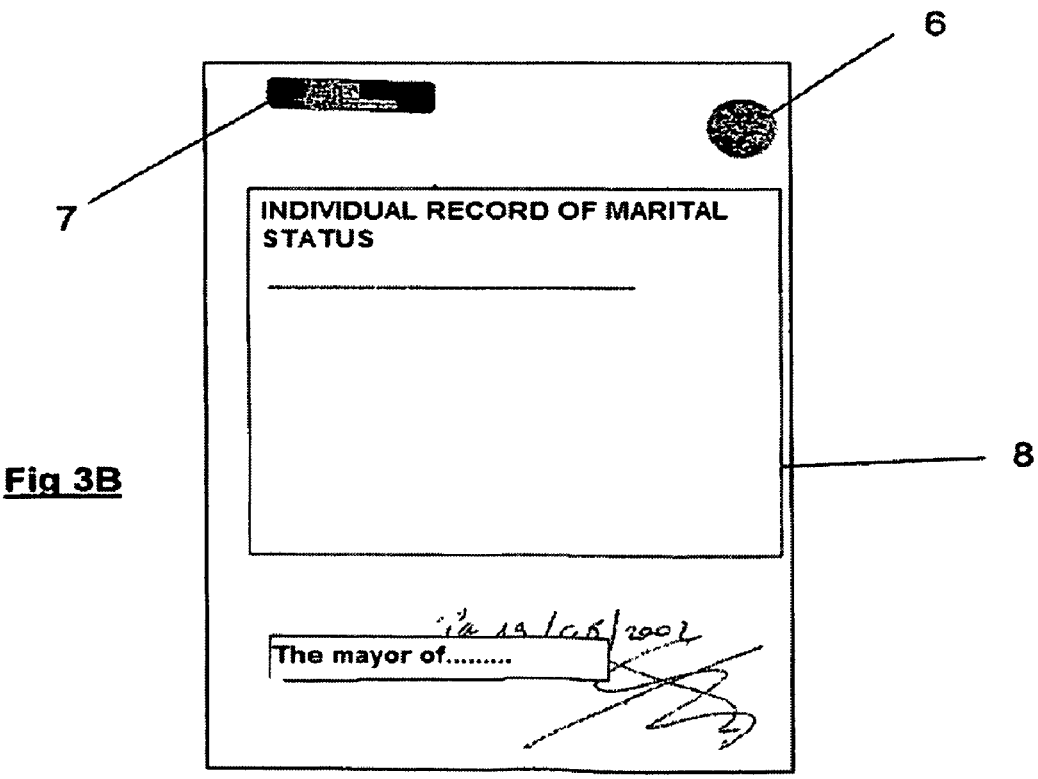
FIG. 3B shows the document of FIG. 3A as it is recorded in the secured computer recording system.

In FIG. 3A, an example of document (8) authenticated by seal (7) is represented, and, in FIG. 3B, the same document is represented as it appears recorded in BD2 after acquisition through reading device (1). Authenticator (6) of the acquisition device appears in the archived document.

Figure 4A:
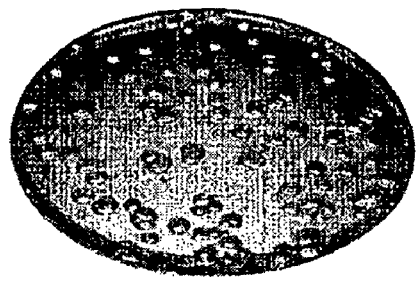
FIG. 4A show a perspective view of a bubble seal of the present invention.

FIG. 4A represents a bubble code constituting a seal, wherein the bubble volumic aspect inside the material is well perceived, hence procuring an authenticating characteristic both very easy to interpret and still unique physically, while impossible to duplicate identically.

Figure 4B:
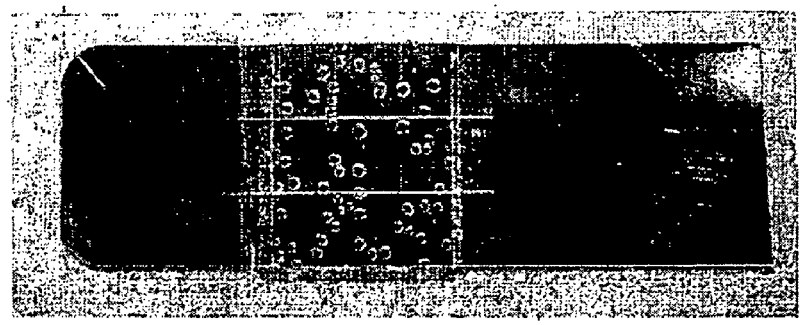
FIG. 4B shows a top view of the bubble seal of FIG. 4A.

FIG. 4B represents a bubble seal in top view, as it may be affixed on an original document.

Figure 4C:
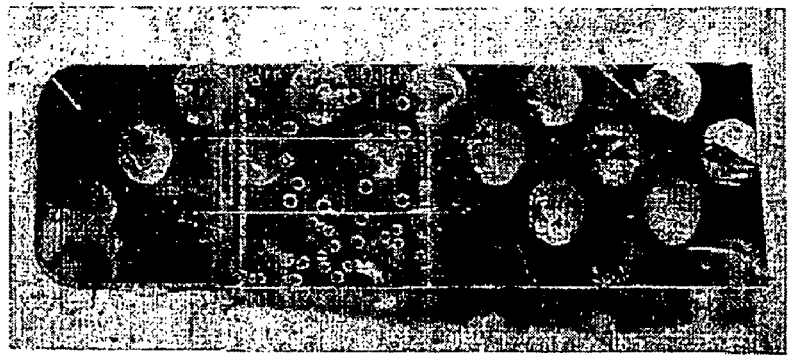
FIG. 4C shows another bubble seal.

FIG. 4C represents a bubble seal that has been torn off, then glued back.

Figure 5:
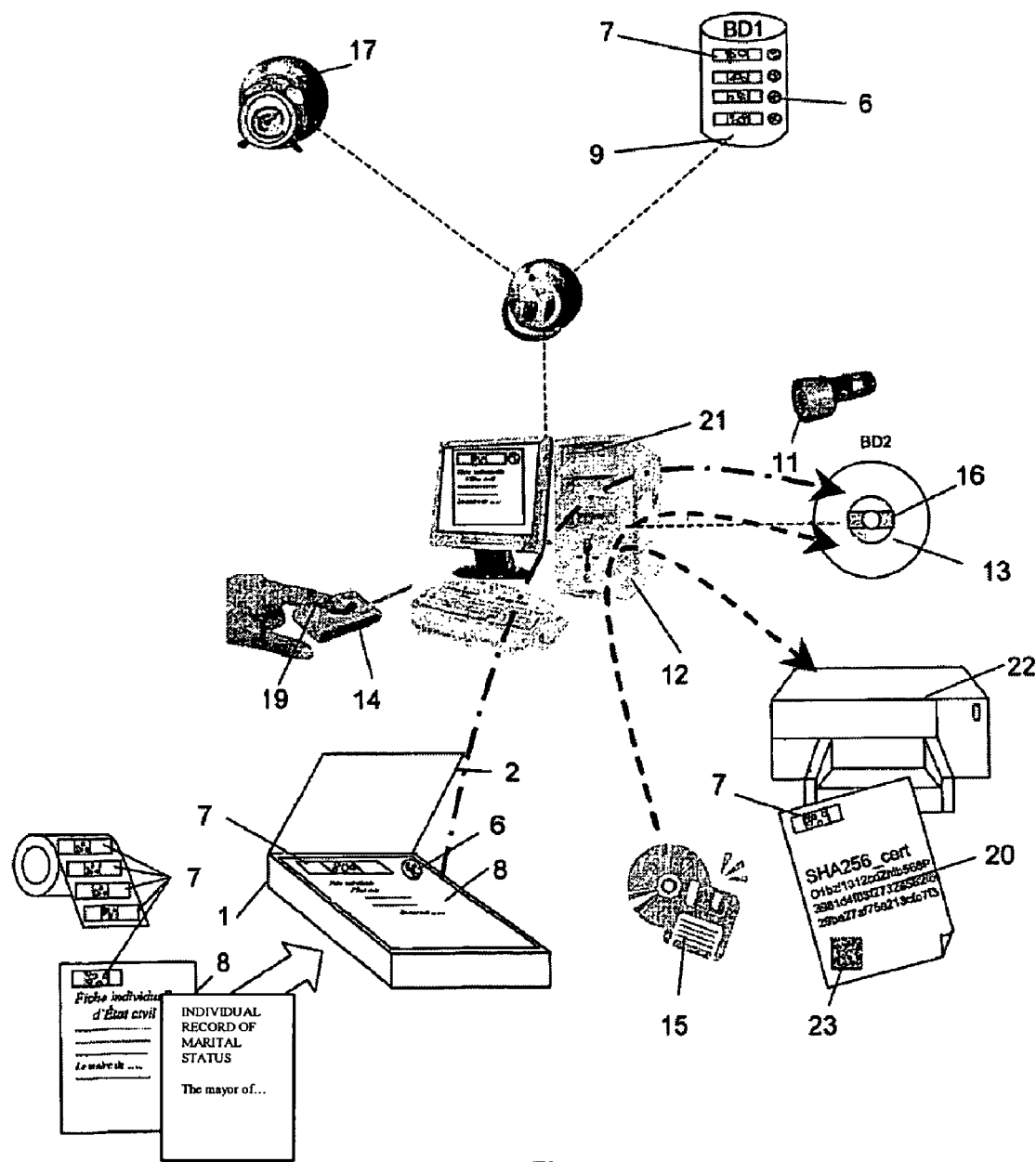
FIG. 5 is a schematic view of the recording operation procedure when the secured computer recording system is a DVD.

FIG. 5 represents the diagram of the recording operation procedure when BD2 is a DVD. Such architecture is particularly interesting because it is completely autonomous and can be used with a standard computer environment connected to the internet, the only specific elements being the bubble seals to be associated to physical or digital documents to be certified, and a non-rewritable CD or DVD authenticated by a bubble seal.

A non-rewritable DVD (13) is made unique using a bubble seal (16) placed in the central ring. Originally, this DVD is assigned to its owner (or to an institution) by enrolling fingerprints (19) using sensor (14). The person's identity (or that of the institution representative) associated with the DVD identity provided by the bubble seal, and at least one fingerprint, are engraved in the header of the non-rewritable DVD using engraver (21). It is noteworthy that the both person's and the seal identities are archived in BD1 (9), the fingerprint won't be archived in this base in many cases for confidentiality reasons, besides it is not useful because this DVD remains the author's strict property, and he should have to produce it only when he needs to provide evidence of authenticity for original physical (8) or digital (15) documents. Bubble seals (7) prerecorded in BD1 (9) for a beneficiary can be glued indifferently on an original physical document (8) to be certified, or on a paper medium (20), onto which an original digital digest will be printed with printer (22), after certification and recording in BD2, which in this case is a DVD optical medium. Scanner (1) is the acquisition tool, on the one hand, of the bubble seal association with physical document (8), and on the other hand, for reading bubble seal (7) carried by sheet (20) that contains a printed reference mark (23) for selecting automatically the presence of a digital original (15) to be certified, which is available in the memory of controlling computer (12). The hardware infrastructure is therefore composed of controlling computer (12) equipped with a DVD burner (21) connected to the internet for accessing BD1 (9) and to a universal time server (17), of a scanner (1), a printer (22), a fingerprint sensor (14), and finally of consumable bubble seals (7) and of BD2 archiving base (13), which is a proprietary DVD in this case. In a completely automated certification procedure, a simple finger application (19) on print reader (14) after setting up DVD (13) in burner (21) followed by apposing a bubble seal (7) on document (8) or (20) is sufficient to trigger the whole certification and recording procedure. After recording in BD2 (13), a receipt associated to recorded physical documents (8) is printed by printer (22); it indicates the digest summary produced by applying the hashing function that includes notably the content, date, signature, or identity of the bubble seal assigned to the document, the bubble seal signature or identity assigned to the DVD, the beneficiary's identity and/or fingerprints, the file size. Said receipt will then be matched with the physical original (8) including bubble seal (7). Once recorded on DVD (13), when it concerns a digital data recording, paper medium (20) containing a freshly scanned bubble seal (7) is placed in the printer. In addition to various titles or keywords that can be printed and are useful to list the recordings in an electronic management system, the digest from applying the hashing function will be printed on (20), containing notably the content, date, signature, or identity of the bubble seal assigned to the digital data, the signature or identity of the bubble seal assigned to the DVD, the beneficiary's identity and/or fingerprints, the file size. Said paper medium (20) containing a bubble seal (7) is the proving object or physical materialization of a dated and personalized digital data certification. Said document is extremely important to keep because it constitutes a telltale. The evidence of content, date, ownership integrity will then be produced by comparing and matching non-modifiable information it contains with the also non-modifiable DVD-archived information.

Figure 6:
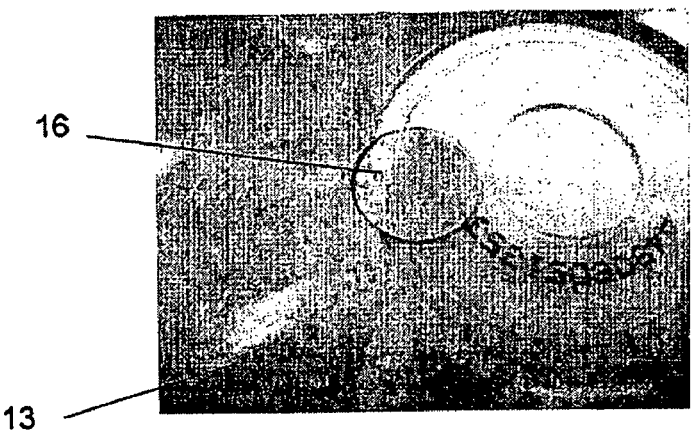
FIG. 6 shows a view of a DVD containing a bubble seal of the present invention.

FIG. 6 represents a non-rewritable DVD (13) containing a bubble seal (16) placed in the central ring. In the method according to the invention, it constitutes a digital archiving means, called BD2. From the presence of this seal with characteristics identical to the ones of the seals used for the documents, said DVD is made unique and impossible to reproduce identically. It is listed in and assigned to database BD1. In the DVD header either its identity is engraved, or the signature of the bubble seal, or both. Similarly, the identity of its owner associated to one or several biometrical prints are engraved initially only if one wants later on to prove ownership. These initial data are then associated and combined with information and bubble seals to be certified then date/time stamped, the assembly is then encapsulated by applying a hashing function, then burned on the non-rewritable DVD.

Figure 7:
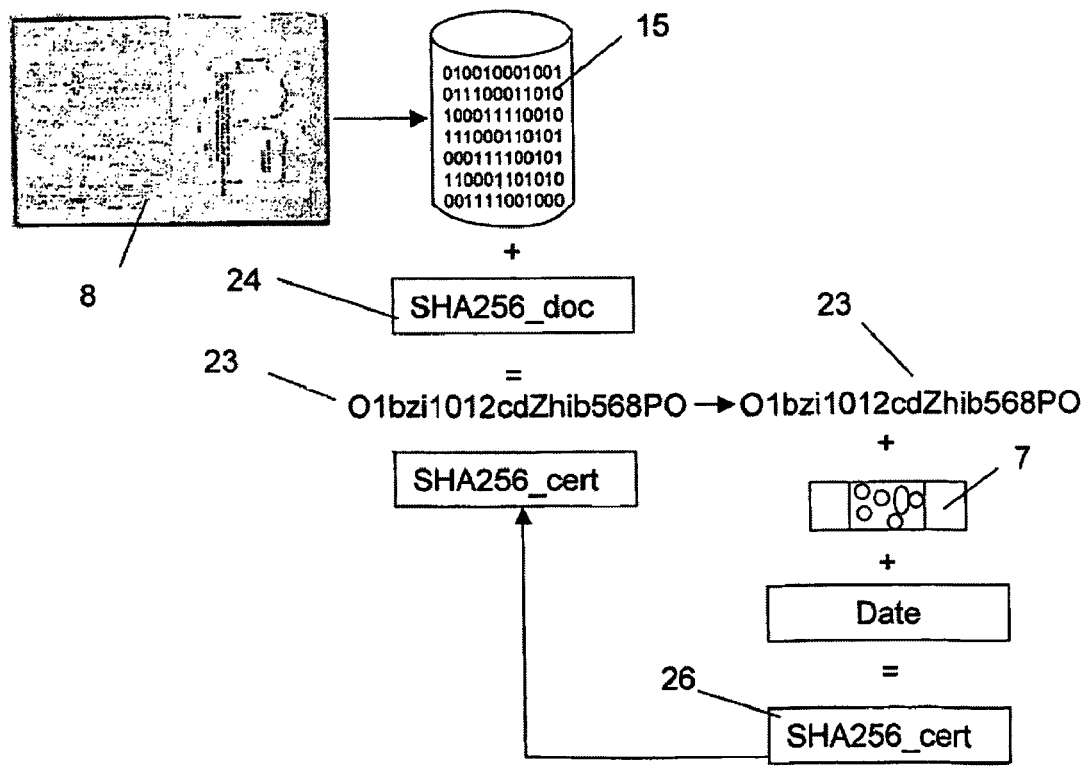
FIG. 7 is a schematic view of a dematerialization procedure of a physical document according to the present invention.

FIG. 7 represents the dematerialization procedure of a physical document. In this hypothetical case, the sought-after goal is to constitute digital archives and to destroy the physical originals. Then the question is to be able to qualify the original digital archive by bringing the evidence of its integrity when interpretation time comes up. Today such evidence is produced by applying a hashing function that provides a summary which is then recorded with the document. Said summary can also be printed on annexed paper to be physically archived and to act as telltale when it becomes necessary to prove the archived digital document authenticity. However, as is, such method is very far from being tamper-resistant because by just knowing the crypting key one can modify the content of the document while reconstituting an identical summary. By applying the method according to the invention, one proceeds in the same way during the certification, constituting a summary (23) by applying selected SHA (Secure Hash Algbrithm) 256 or 512 type of hashing function called SHA256_doc (24), said summary (23) is associated to the signature of a bubble seal (7) which, in this hypothetical case doesn't need to be necessarily prerecorded in BD1 base, to provide another summary with date/time stamping, said latter summary called SHA 256_cert (26) is plainly written next to the bubble seal then recorded in the same archival document (15). Bubble seal (7) used for certification with SHA_256cert (or summary) writen next to it constitutes the rematerialized but more importantly tamper-resistant telltale of the archived digital document. Subsequently, all it takes to evidence the authenticity of archived document (15) is to recompute the summary of the archived digital part associated with the signature of used bubble seal (7) by applying the same SHA as when certifying, and to compare the digitalized document SHA_256cert summary to the one written next to the bubble seal. If they match the document is intact.

There are many applications for this invention, as generally this method will enable to materialize and certify original logical information and to certify original physical documents, the assembly can then be authenticated regarding the integrity of content, date, and possibly ownership. In summary, this method makes it possible to pass in full safety from the physical world to the digital world by certifying in a material way information which becomes unfalsifiable, and by bringing the tools and the method makes it possible to provide evidence of such authenticity. The concept of evidence lies in the dual nature of a physical information item and a digital information item, one being telltale of the other which is non-modifiable without risking to loose the evidence. The bubble seal constitutes the keystone of these two items of information. Thus, to a physical original document associated to a bubble seal corresponds a dematerialized, date/time stamped, telltale counter-part, and to a date/time stamped digital original document corresponds a telltale counter-part materialized by a bubble seal. In both physical/logical and logical/physical hypothetical cases, the bubble seal acts as a physical and logical bridge inaccessible to man other than for reading, and is the safety keystone between both physical and logical worlds. Said bridge is not to be crossed because it is physically tamper-resistant and accessible solely by reading and not by writing, and its extracted signature is a constant to be used in combination with all other data to be certified to generate a unique hash code. Thereafter an attempt to tamper with the integrity of one data would require actions on both the physical and logical sides, but also on the authenticating part of the bubble seal, which is physically and logically impossible unless the constitution of evidence in its entirety collapses in an irreversible way.

The examples hereafter are provided as illustration. With regard to written pages of laboratory notebooks, the extremely rigorous and coercive formalism doesn't put protected from future objections, whether regarding content or date integrity when economic stakes are significant. Such paper notebook doesn't allow to integrate more and more digital data, which creates a real problem because such data are part of the researcher's environment. The method according to the invention brings an answer to suppressing the legal risks for constituting evidences of precedence, authorship (or paternity), and date, whether for paper documents, without any formalism (therefore without constraints), or for computer data; moreover all these works can then be computer processed by document electronic management systems.

Generally with regard to intellectual property or royalties, this method allows in a practical and non-expensive way to manage and constitute a intellectual heritage of works or originals (written or digital) with constitutions of sure evidences of content, date and authorship in an unquestionable way, which leads to a real revolution in a real time intellectual property archiving strategy. Such method can be adapted has a new form of Soleau envelope which is currently in paper and may become entirely electronic, with certain advantages regarding security and processing speed, but also possibility recording and date/time stamping of digital data, that is not possible today. In this application, whether dealing with paper media or digital data, the physical or logical counter part is with the author or the institution managing Industrial Property knowing that such Institution issues, controls, and date/time stamps the bubble seals.

An important application is for dematerializing of all sorts of documents of businesses or administrations, those occupying larger and larger volumes, knowing that today digital archiving following the destruction of paper originals loses the original evidence with possible controversy about date and content integrity. Here the method according to the invention also contributes an answer to constituting sure evidences, since as it is constituted of a materialized counter-part of the archived digital document(s), knowing that the volume comparison between physical originals and materialized counter-part following digital archiving can be divided by 10, 100, 1000 or more, according to each processing unit (as an example, for one A4 page, the volume is divided by 20, and for a 100 page file, it is divided by 2000)

Such method can also be used for delivering administrative documents of all kinds, in order to avoid using false documents to get real ones issued. It may be used for electronically issuing true authentic certified notarized acts.

This method can be used for sending certified mail or certified electronics where the seal is the certification seal but also the key for computing and verifying authenticity.

Moreover, the method according to the invention permits to by-pass evidence agreements between parties to secure paperless exchanges by bringing newly materialized evidences which become therefore operational for the third parties.

The invention claimed is:

1. A method for certification and later authentication of original information under the form of text or binary files (15) or of original documents in physical form (8) provided by an issuer, the method including the following steps:
(a) associating the original document (8) or original information (15) with a unique and non-reproducible authenticator previously recorded in a centralized database (9) of a trusted third party, wherein the content integrity of the original document (8) or original information (15) is certified by the issuer, wherein the unique and non-reproducible authenticator is a seal (7);
(b) digitalizing opto-electronically said original document (8) or original information (15) using a device (1) enabling the content of the original document (8) or original information (15) to be linked with said unique and non-reproducible authenticator (7) in a single operation, wherein the device (1) is connected directly or indirectly through a network (18) to a secured computer recording system (10)(13), wherein the computer recording system (10)(13) is local or remote, wherein the device (1) is a scanner with a bubble seal (6) integrated in said scanner enabling simultaneous authentication of the device (1) and affiliation of the device (1) with the original document (8) or original information (15) upon reading the original document (8) or the original information (15) and the seal (7) associated with the original document (8) or original information (15);
(c) transmitting to and recording in the secured computer recording system (10)(13) a logical copy (8') of said original document (8) or original information (15) and associated authenticator, wherein the logical copy (8') is date/time stamped, non-modifiable, and non-rewriteable, wherein the logical copy (8') is archived in the secured computer recording system (10)(13) at an address corresponding to the associated authenticator; and
(d) in order to authenticate a presented document or information, comparing said presented document or information with either the logical copy (8') archived in the secured computer recording system (10)(13) or a condensed summary product of an applied hashing function in order to determine whether the presented document or information is the original document (8) or original information (15).

2. The method according to claim 1, wherein the bubble seal (6) of the device (1) is pre-recorded and assigned in the centralized database (9) of the trusted third party.

3. The method according to claim 1, characterized in that the content of the logical copy archived in the secured computer recording system is associated with a unique logical signature extracted from the authenticator in order to generate a one way hash code of the content of the logical copy in combination at least with the date/time stamping.

4. The method according to claim 1, characterized in that the condensed summary product of the applied hashing function is printed on a paper medium (20) on which is already glued a bubble seal (7), the bubble seal having a unique and non-reproducible signature that allows for subsequent authentication of the condensed summary product.

5. The method according to claim 1, characterized in that the secured computer recording system (10) is an electronic safe built within a certified date/time stamping device, enabling to associate the date certifying each recording.

6. The method of claim 1, wherein the seal (7) is pre-recorded and assigned in the centralized database (9);
wherein the seal (7) is apposed onto the original document (8) or onto an annexed medium (20) for the original information (15) in digital form; and
wherein the centralized database (9) is queried in order to verify whether the seal (7) is pre-recorded, non used, or possibly not yet consulted before transmitting and recording the logical copy (8') into the secured computer recording system.

7. The method of claim 1, wherein the original document (8) or the original information (15) has a bubble seal (7), and the original document (8) or the original information (15) having the bubble seal (7) is placed onto the scanner; and during reading of the original document (8) or the original information (15), the bubble seal (7) associated with the original document (8) or the original information (15) and the bubble seal (6) associated with the scanner are simultaneously read such that the logical copy (8') contains information related to both the bubble seal (7) associated with the original document (8) or the original information (15) and the bubble seal (6) associated with the scanner.

8. The method of claim 1, wherein the centralized database (9) is independent of the secured computer recording system.

9. A method for certification and later authentication of original information under the form of text or binary files (15) or of original documents in physical form (8) provided by an issuer, the method including the following steps:
(a) associating the original document (8) or original information (15) with a unique and non-reproducible authenticator previously recorded in a centralized database (9) of a trusted third party, wherein the content integrity of the original document (8) or original information (15) is certified by the issuer, wherein the unique and non-reproducible authenticator is a seal (7);

(b) digitalizing opto-electronically said original document (8) or original information (15) using a device (1) enabling the content of the original document (8) or original information (15) to be linked with said unique and non-reproducible authenticator (7) in a single operation, wherein the device (1) is connected directly or indirectly through a network (18) to a secured computer recording system (10)(13), wherein the computer recording system (10)(13) is local or remote;

(c) transmitting to and recording in the secured computer recording system (10)(13) a logical copy (8') of said original document (8) or original information (15) and associated authenticator, wherein the logical copy (8') is date/time stamped, non-modifiable, and non-rewriteable, wherein the logical copy (8') is archived in the secured computer recording system (10)(13) at an address corresponding to the associated authenticator; wherein the secured computer recording system is a non-rewritable DVD (13) authenticated by a bubble seal (16) that is physically integrated with the non-rewritable DVD; and (d) in order to authenticate a presented document or information, comparing said presented document or information with either the logical copy (8') archived in the secured computer recording system (10)(13) or a condensed summary product of an applied hashing function in order to determine whether the presented document or information is the original document (8) or original information (15).

10. The method according to claim 9, wherein access to the secured computer recording system (10) (13) is authorized by a biometrical print control done through a sensor (14), wherein biometrical prints of at least one person having ownership rights in the original document (8) or the original digital information (15) are previously recorded in the secured computer recording system (10) (13) in order to be able to make a link of ownership rights with the original document (8) or the original digital information (15).

11. The method according to claim 10, characterized in that the content of the logical copy archived in the secured computer recording system is associated with a unique logical signature extracted from the physical authenticator in order to generate a one way hash code of the content of the logical copy in combination at least with the date/time stamping and at least one biometric print (19).

12. The method according to claim 9, wherein the secured computer recording system (13) is in communication with a Universal Time server (17) enabling to burn in and certify the date/time stamping on said DVD (13) at the time of each original information (15) or document (8) recording.

13. A reading device comprising a scanner enabling simultaneous recording of an original document and an associated bubble seal affixed to the original document for the purpose of proving subsequently that the original document is authentic, each bubble seal comprising a plurality of bubbles, the scanner comprising a transparent glass, a bubble seal built into the transparent glass, and an electroluminescent diode rail that moves relative to the transparent glass, wherein the electroluminescent diode rail generates lighting to cause reflections on the bubbles of the bubble seal affixed to the original document in order to prove that the bubble seal affixed to the original document is authentic, and wherein the bubble seal built into the transparent glass allows the scanner to be associated with a recorded copy of the original documents.

14. The reading device of claim 13, wherein the bubble seal built into the transparent glass of the scanner is unique and non-reproducible.

* * * * *

UNITED STATES PATENT AND TRADEMARK OFFICE
CERTIFICATE OF CORRECTION

Page 1 of 1

PATENT NO. : 8,056,822 B2
APPLICATION NO. : 12/158409
DATED : November 15, 2011
INVENTOR(S) : Francis Bourrieres, Clement Kaiser and Franck Bourrieres It is certified that error appears in the above-identified patent and that said Letters Patent is hereby corrected as shown below:

Front page, (22) PCT Filed: Nov. 9, 2006 should be corrected to show "PCT Filed: Dec. 19, 2006"

Column 1, Lines 9-10, This application is a US National Stage entry of PCT/FR2006/002799, filed Nov. 9, 2006 should be corrected to show "This application is a US National Stage entry of PCT/FR2006/002799, filed Dec. 19, 2006"

Signed and Sealed this
Third Day of January, 2012

David J. Kappos
*Director of the United States Patent and Trademark Office*